US008799957B2

(12) United States Patent
Kunisetty

(10) Patent No.: US 8,799,957 B2
(45) Date of Patent: Aug. 5, 2014

(54) ELECTRONIC PROGRAM GUIDE WITH DISPLAY OF ALTERNATIVE-SOURCE MULTIMEDIA PROGRAM OPTIONS AND ESTIMATED AVAILABILITY PARAMETERS

(71) Applicant: General Instrument Corporation, Horsham, PA (US)

(72) Inventor: Sridhar Kunisetty, Fremont, CA (US)

(73) Assignee: Motorola Mobility LLC, Libertyville, IL (US)

( * ) Notice: Subject to any disclaimer, the term of this patent is extended or adjusted under 35 U.S.C. 154(b) by 0 days.

(21) Appl. No.: 13/671,696

(22) Filed: Nov. 8, 2012

(65) Prior Publication Data

US 2014/0130092 A1    May 8, 2014

(51) Int. Cl.
G06F 3/00        (2006.01)
G06F 13/00       (2006.01)
H04N 5/445       (2011.01)

(52) U.S. Cl.
USPC ............... 725/49; 725/40; 725/48; 725/51

(58) Field of Classification Search
USPC ............... 725/37, 38, 39, 40, 48, 49, 51
See application file for complete search history.

(56) References Cited

U.S. PATENT DOCUMENTS

| 5,666,645 | A  | 9/1997  | Thomas et al.   |
| 5,923,362 | A  | 7/1999  | Klosterman      |
| 6,003,041 | A  | 12/1999 | Wugofski        |
| 7,036,137 | B1 | 4/2006  | Arsenault et al.|
| 7,228,305 | B1 | 6/2007  | Eyal et al.     |
| 7,496,946 | B1 | 2/2009  | Wehmeyer et al. |
| 7,634,791 | B2 | 12/2009 | Barrett et al.  |
| 7,937,725 | B1 | 5/2011  | Schaffer et al. |
| 7,987,482 | B2 | 7/2011  | de Heer         |
| 8,051,450 | B2 | 11/2011 | Robarts et al.  |
| 2002/0174445 | A1 | 11/2002 | Miller et al. |
| 2008/0307053 | A1 | 12/2008 | Mitnick et al. |
| 2009/0089852 | A1 | 4/2009  | Randolph et al. |
| 2009/0187943 | A1 | 7/2009  | McCarthy et al. |
| 2009/0199238 | A1 | 8/2009  | Kummer et al. |

(Continued)

FOREIGN PATENT DOCUMENTS

WO    2011112266 A2    9/2011

OTHER PUBLICATIONS

Miso blogs, "More Power to the Miso People!", blog.gosmiso.com/2010/11/04/more-power-to-the-miso-people/, downloaded from Internet Apr. 11, 2012, all pages.

(Continued)

Primary Examiner — John Schnurr

(57) ABSTRACT

An electronic program guide ("EPG") coordinates the display of availability metadata representing the availability of listed multimedia programs from one or more alternative content sources. The EPG presents multimedia programs available from a primary content source. A system identifies alternative content sources for one or more multimedia programs listed in the EPG, estimates availability parameters from these alternative content sources, and supplements the EPG with availability metadata that represent the determined availability parameters of the versions of the multimedia programs from one or more alternative content sources. The system estimates missing availability parameters based on application of one or more availability rule sets, which can reflect, for example, a contractual agreement or arrangement, a data analysis performed on historical availability data for the multimedia program or the content provider, and the like.

20 Claims, 9 Drawing Sheets

(56) References Cited

U.S. PATENT DOCUMENTS

| | | |
|---|---|---|
| 2009/0249402 A1 | 10/2009 | Lee |
| 2010/0030764 A1 | 2/2010 | Koren |
| 2010/0107196 A1* | 4/2010 | Kitayama .................. 725/46 |
| 2010/0114857 A1 | 5/2010 | Edwards et al. |
| 2010/0159369 A1 | 6/2010 | Hiroshima |
| 2010/0299688 A1 | 11/2010 | Howcroft et al. |
| 2011/0078736 A1 | 3/2011 | Thomas |
| 2011/0126230 A1 | 5/2011 | Dow et al. |
| 2011/0126249 A1* | 5/2011 | Makhlouf .................. 725/109 |
| 2011/0283320 A1 | 11/2011 | Levin et al. |
| 2012/0284749 A1* | 11/2012 | Lee et al. .................. 725/39 |

OTHER PUBLICATIONS

Google TV: What is it, What you can watch, how it works, where to get it, http://www.googletv.com, downloaded from internet: Nov. 8, 2012, all pages.

United States Patent and Trademark Office, "Non-Final Rejection" for U.S. Appl. No. 13/671,712 dated Nov. 18, 2013, 20 pages.

\* cited by examiner

ELECTRONIC PROGRAM GUIDE WITH DISPLAY OF ALTERNATIVE-SOURCE MULTIMEDIA PROGRAM OPTIONS AND ESTIMATED AVAILABILITY PARAMETERS

CROSS-REFERENCE TO RELATED APPLICATIONS

The present application is related to U.S. patent application Ser. No. 13/671,712, filed on an even date herewith.

TECHNICAL FIELD

The present disclosure is related generally to multimedia-content services and, more particularly, to electronic program guides.

BACKGROUND

Traditionally, television programs, movies, and other multimedia programs were delivered to users as linear-television content; that is, television programs were delivered to the users through over-the-air television station broadcasts or through the communications networks of cable-television providers and satellite-television providers. The adaptation of the communications networks of cable-television providers and satellite-television providers to providing broadband Internet access and the advent of Internet-based multimedia-content sources, often referred to as over-the-top ("OTT") content sources, have provided users with multiple potential alternative sources of a desired multimedia program. However, as these alternative sources typically are controlled by separate entities, and as many OTT content sources do not facilitate ready access to their schedules of available multimedia programs, a user generally must separately reference each content provider's program guide in turn in order to identify the available options for viewing a desired multimedia program. Typically, this presents too great of a burden on the user, who often defaults to seeking the desired multimedia program via the program guide of a preferred content provider, and who thereby misses out on potentially better options (such as an alternative version having a higher display resolution or having a lower access cost) for the multimedia program from a different content provider.

BRIEF DESCRIPTION OF THE SEVERAL VIEWS OF THE DRAWINGS

While the appended claims set forth the features of the present techniques with particularity, these techniques, together with their objects and advantages, may be best understood from the following detailed description taken in conjunction with the accompanying drawings of which:

DETAILED DESCRIPTION

Figure 1:
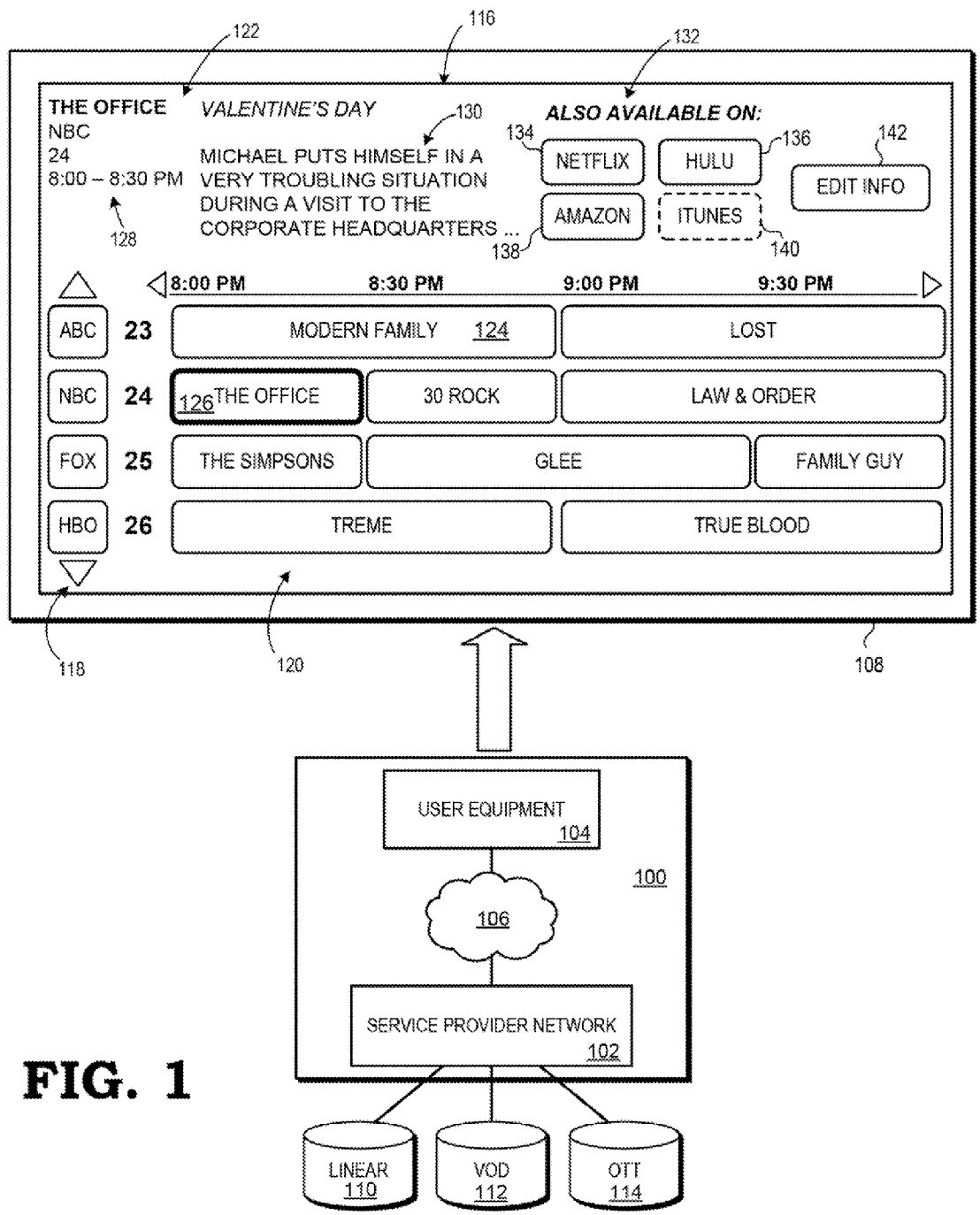
FIG. 1 is a diagram illustrating an example multimedia-content distribution system providing an electronic program guide in accordance with at least one embodiment of the present disclosure.

Turning to the drawings, wherein like reference numerals refer to like elements, techniques of the present disclosure are illustrated as being implemented in a suitable environment. The following description is intended to convey a thorough understanding of the present disclosure by providing a number of specific embodiments and details involving user interaction with an electronic program guide. It is understood, however, that the present disclosure is not limited to these specific embodiments and details, which are examples only, and the scope of the disclosure is accordingly intended to be limited only by the following claims and equivalents thereof. It is further understood that one possessing ordinary skill in the art, in light of known systems and methods, would appreciate the use of the invention for its intended purposes and benefits in any number of alternative embodiments, depending upon specific design and other needs.

FIGS. 1 through 12 generally illustrate example devices and techniques for providing users with an electronic program guide ("EPG") that coordinates the display of availability metadata representing the availability of listed multimedia programs from one or more alternative content sources. In at least embodiment, the EPG presents multimedia programs available from a primary content source, such as a linear-television broadcaster or from a cable-television provider. A system, which may be implemented at one or both of a service-provider network or user equipment, identifies alternative content sources for one or more multimedia programs listed in the EPG, determines availability parameters from these alternative content sources, and supplements the EPG with availability metadata that represent the determined availability parameters of the versions of the multimedia programs from one or more alternative content sources. These versions of multimedia programs available from an alternative content source are referred to herein as "alternative-source multimedia programs" or "alternative-source versions of the multimedia program." The availability parameters for an alternative-source multimedia program can include, for example, one or more of an availability of a version of the multimedia program from an alternative content source, an availability start date, an availability end date, an image resolution or quality, and a price of access. In certain instances, one or more of these availability parameters may not be expressly identified by, or expressly available from, the alternative content source or other source. In such instances, the system estimates the missing availability parameter based on application of one or more availability rule sets, which can reflect, for example, a contractual agreement or arrangement between the alternative content source and the producer, distributor, owner, or other entity in control of the content represented by the multimedia program, a data analysis performed on historical availability data for the multimedia program or the content provider, and the like.

FIGS. 1 through 12 also generally illustrate example devices and techniques for facilitating user input to identify potentially inaccurate program metadata displayed in an EPG and, in some implementations, to provide a proposed correction to the identified program metadata. The displayed program metadata can include, for example, program title, series title, channel, start time, end time, price to access, resolution or quality, various availability metadata, and the like. The displayed program metadata may be incorrect, misleading, or otherwise inaccurate. Accordingly, in at least one embodiment, a service-provider network facilitates display of an EPG at user equipment that facilitates user feedback to identify or propose corrections to potentially inaccurate program metadata through users' interactions with a user-feedback interface of the EPGs displayed at users' equipment. The user-feedback interface, in one embodiment, may include a "flag-for-correction" feedback option whereby the user flags program metadata as potentially inaccurate. In response to receiving at least a specified threshold number of "flag-for-correction" indicators from a subset of the users serviced by the service-provider network for particular program metadata, the service-provider network may alert an administrator to initiate the administrator's review of the flagged program metadata for errors and, if appropriate, correction of the flagged program metadata. In other embodiments, the user-feedback interface includes an interface that permits the users to propose corrected versions of the identified program metadata. For example, the user interface could include user-input fields in which the users could supply, for example, a proposed corrected program title, a proposed corrected start time, a proposed corrected end time, proposed corrected availability metadata, and the like. The service-provider network may then initiate administrative review of the program metadata in question in response to the proposed correction indicators or even enable automatic correction of the program metadata in question in response to the user feedback. These user-feedback techniques can be used in conjunction with the techniques for displaying the availability metadata for alternative-source versions of multimedia programs as described herein, such as by facilitating user feedback on the availability start date, end date, or general availability, of an alternative-source multimedia program, the price of access to the alternative-source multimedia program, the image resolution or display quality of the alternative-source multimedia program, the uniform resource locator or other link to the alternative-source multimedia program, and the like.

FIG. 1 illustrates a multimedia-content distribution system 100 for providing an EPG that provides alternative availability metadata and facilitates user feedback for identifying potentially inaccurate program metadata in accordance with at least embodiment of the present disclosure. In the depicted example, the multimedia-content distribution system 100 includes a service-provider network 102 connected to a plurality of user equipment (a single instance of which is depicted as user equipment 104) via a communications network 106. The service-provider network 102 provides multimedia-content delivery services and can comprise, for example, a terrestrial television-broadcast network, a cable-television network, a satellite-television network, a cellular-telephony network, and the like. The user equipment 104 can include any of a variety of end-user devices used to receive and to consume multimedia content, such as a television, a set-top box, a digital video recorder, a tablet computer, a personal computer, a video-enabled cellular phone, a portable video player, and the like.

The user equipment 104 integrates, or is coupleable to, a display 108 used to present the video content of a multimedia program selected by a user. The user equipment 104 further can include a remote control device, touchscreen, keyboard, button panel, or other human-machine interface to facilitate user input to control operation of the user equipment 104. The user equipment 104 further may include a network interface device, such as a cable modem, a satellite modem, a wireless-access point, or router, that serves as the local network termination point for the communications network 106. The communications network 106 can comprise any of a variety of communications networks or combination thereof, such as a cable-television distribution network, a wide area network, a cellular-phone network, the Internet, and the like. In at least one embodiment, the communications network 106 provides the user equipment 104 with Internet access or other wide area network access, such as broadband Internet access supplied through the cable-television distribution network of a cable-television provider or broadband Internet access supplied to cellular data-enabled devices by a cellular-phone service provider. In other embodiments, the user equipment 104 includes a separate interface or connection (not shown) to the Internet or other wide area network.

The service-provider network 102 operates to provide the user equipment 104 with multimedia programs via the communications network 106 or via a separate interface to the Internet employed by the user equipment 104. The multimedia programs may originate from various content sources, including one or more linear-television content sources 110 (e.g., terrestrial television-broadcast sources, cable-television sources, or satellite-television sources), one or more video-on-demand ("VOD") content sources 112, or from one or more Internet-based multimedia-content sources 114 (referred to collectively as "multimedia-content sources 110 through 114"). The Internet-based multimedia-content sources 114 are typically referred to in the art as "over-the-top" or "OTT" content sources in reference to the typical arrangement whereby the multimedia content provided by these sources is provided via the Internet connection afforded by the communications network 106 of the service-provider network 102 but is not multimedia content sourced by the service-provider network 102. Accordingly, for ease of reference, the Internet-based multimedia-content sources 114 are referred to herein as OTT content sources 114. Current commercial examples of such OTT content sources include multimedia-program subscription services, multimedia-program streaming services, and multimedia-program streaming and downloading services.

To facilitate a users' selections of multimedia programs for display at the user equipment 104, the service-provider network 102 also typically provides an EPG 116 to each user equipment 104, whereby the EPG 116 primarily represents the current program lineup available from the primary, or default, content source of the service-provider network 102. This primary content source typically is the linear-television content source 110 but instead may comprise a different content source, such as one of the OTT content sources 114. For ease of description, the linear-television content source 110 is assumed to be the primary content source for the example embodiments described herein. As such, the OTT content sources 114 and the VOD content sources 112 are assumed to be the alternative content sources for the example embodiments described herein. However, in other embodiments an OTT content source 114 may comprise the primary content source, and the linear-television content source 110 may be an alternative content source.

The EPG 116 comprises a graphical user interface which presents various program-related information (i.e., program metadata) to the user and with which the user may interact to initiate various actions. The EPG 116 may be implemented as a web-page-based graphical user interface (that is, implemented via a hypertext-markup-language-based structure), or implemented as a custom graphical user interface integrated with the firmware or software executing at the user equipment 104, and the like. The program metadata presented via the EPG 116 can include a navigable display 118 of the channels available from the primary content source, a navigable display 120 of the current program lineup of multimedia programs available from the primary content source, and a display of program metadata 122 associated with a multimedia program selected by the user from the current program lineup.

For linear-television programming, the navigable display 120 of the current program lineup can include a time by channel grid or matrix whereby each channel is represented by a row and each time slot (e.g., of a half-hour duration) is represented by a column, and thus the primary-source multimedia program available at a particular channel in a particular timeslot is represented by a program icon or program title at the intersection of the corresponding row and the corresponding column. To illustrate, in the example of FIG. 1 a multimedia program entitled "Modern Family" is broadcast on channel 23 from 8:00-9:00 P.M. and thus is represented in the current program lineup grid by a program icon 124 that extends across the two columns representing the 8:00-8:30 P.M. and the 8:30-9:00 P.M. time slots in the first row, which corresponds to channel 23. As another example, in the example of FIG. 1 a multimedia program entitled "The Office" is broadcast on channel 24 from 8:00-8:30 P.M. and thus is represented in the current program lineup matrix by a program icon 126 that occupies the intersection of the column representing the 8:00-8:30 P.M. time slot with the row representing channel 24.

Unlike linear-content sources, multimedia programs provided by an OTT content source typically are not tied to particular time slots or to particular channels, and thus in instances whereby an OTT content source 114 is the primary content source associated with the EPG 116, the navigable display 120 of the current program lineup may present the available multimedia programs as, for example, a navigable list, a navigable grid or matrix of icons with or without corresponding description, a set of hierarchical windows or tabs that arrange multimedia programs by certain common characteristics (e.g., genre, common themes, actors, directors, etc.), and the like.

The program metadata 122 displayed in the EPG 116 for a selected multimedia program of the current program lineup can include, for example, general program metadata 128, such as the name of the series if the selected multimedia program is an episode of the series, the broadcaster or producer of the selected multimedia program, the channel on which the selected multimedia program is available, the scheduled start time and end time of the multimedia program, and the like. The displayed program metadata 122 further can include synopsis metadata 130 that presents, for example, the title of the episode if the multimedia program is an episode of a series, a synopsis of the multimedia program, the actors appearing in the program, the date of first airing, and the like.

As noted above, the user equipment 104 may have access to versions of multimedia programs from a variety of content sources, and thus multiple versions of certain multimedia programs may be available from more than one content source at any given time. A content source other than the primary content source associated with the EPG 116 is referred to herein as "an alternative content source." In many instances, the user may prefer to access a version of a multimedia program from an alternative content source rather than the version available from the primary content source associated with the EPG 116 for any of a variety of reasons. For example, the multimedia program may be available at a higher resolution or accessible at a different price from an alternative content source. As another example, the multimedia program may be available at a more desirable time (or available on-demand) than the time that the multimedia program is scheduled to air by the primary content source.

Thus, to facilitate the user's ability to select an alternative content source of a desired multimedia program, the EPG 116 further may present visual indicators of availability metadata representing available alternative-source versions for a multimedia program represented in the display 120 of the current program lineup of the primary content source. In the example of FIG. 1, these visual indicators may be presented in the form of a navigable display 132 of alternative-source versions of a selected multimedia program, whereby the availability of the multimedia program from an alternative content source may be indicated by a selectable icon or other field within the navigable display 132. To illustrate, in response to the user selecting the program icon 126 from the current program lineup to indicate a selection of an episode entitled "Valentine's Day" for the series entitled "The Office," the EPG 116 may present, via the navigable display 132, selectable availability icons 134, 136, 138, and 140 (referred to collectively as "availability icons 134 through 140"), each selectable availability icon representing one or more availability parameters for the version of the selected "Valentine's Day" episode available from a corresponding one of four OTT content sources. Each selectable availability icon 134 through 140 may have one or more visual characteristics that reflect various availability parameters for the version of the multimedia program from the corresponding OTT content source. For example, when the multimedia program is available from an alternative content source, the selectable icon associated with that alternative content source may have unbroken lines or exhibit a particular color to represent that a version of the multimedia program is available from the alternative content source. Conversely, when the multimedia program is not available from an alternative content source, the selectable icon associated with that alternative content source may have broken lines, be shaded, or exhibit a different color to represent that the multimedia program is not available from the alternative content source.

The selectable icons 134 through 140 further may present other availability metadata, such as a dollar sign ($) or other icon indicating there is a fee to access the multimedia program from the corresponding alternative content source, an icon indicating a resolution or video quality of the version of the multimedia program available from the corresponding alternative content source (e.g., the display of the one of the acronyms "HD" or "SD" to high definition or standard definition, respectively), a visual indicator that the multimedia program will soon be unavailable from the corresponding alternative content source, and the like. In the event that there are multiple versions of the multimedia program available from the same alternative content source (e.g., a standard-definition version and a high-definition version), a selectable icon may be displayed for each version.

Availability metadata for the alternative content sources may not be expressly available from, or expressly identified by, the alternative content sources or other source, and thus certain availability metadata, such as the availability start date, the availability end date, the price, or the quality, may need to be estimated based on the application of one or more rule sets to input data, based on the analysis of access patterns present in historical availability data, or based on a combination thereof. Various techniques for estimating the availability metadata of alternative-source versions of multimedia programs are described in greater detail below with reference to FIG. 3 and FIGS. 7 through 9.

A user's selection of one of the selectable availability icons 134 through 140 triggers the EPG 116 to initiate the access and presentation of the selected multimedia program from the alternative content source associated with the selected icon. This process can include, for example, initiating the download or streaming of the data from a network location of the alternative content source, initializing or configuring a separate application (e.g., a web browser) used to view the multimedia program from the alternative content source, or directing the EPG 116 or a separate web-browser to a webpage or other graphical user interface through which the user can login to the alternative content source, arrange, if necessary, for payment for the price to access the multimedia program from the alternative content source, and initiate downloading or presentation of the multimedia program.

Due to a variety of factors, there is the potential for the program metadata 122 displayed via the EPG 116 to be inaccurate. Dynamic changes in the current program lineup, such as when a sporting event or a presidential debate overruns its allotted time slot, may cause changes to the start times and end times of multimedia programs of one or more channels or one or more content sources. Moreover, as described in greater detail below, certain availability metadata may not be expressly available or expressly identified by content sources, and thus certain availability parameters, such as the availability start date, the availability end date, the price, or the quality, may need to be estimated based on the application of a specified rule set derived from, for example, contractual arrangements among the involved parties or based on an analysis of historical availability data. As these availability parameters are estimates, they may be inaccurate and thus in need of correction. In at least one embodiment, the service-provider network 102 may leverage the user's ability to interact via the EPG 116 to obtain user feedback identifying program metadata that are potentially incorrect or misleading. The service-provider network 102 then takes an appropriate action in response.

To this end, the EPG 116 may implement a selectable icon or other user-navigable field 142 to allow a user to initiate user feedback to identify inaccurate program metadata, and, in some embodiments, to allow a user to submit user feedback in the form of an indicator of a proposed correction to potentially incorrect or misleading program metadata. This user feedback then may be used, alone or in aggregation with feedback from other users for the same program metadata, to initiate administrative review and correction of the identified program metadata, or in the case of user-proposed corrections to identified program metadata, to automatically correct the identified program metadata based on the users' proposed corrections. Example techniques for obtaining and implementing user feedback for potentially inaccurate program metadata of an EPG are described in greater detail below with reference to FIGS. 3 through 7 and FIGS. 10 through 12.

Figure 2:
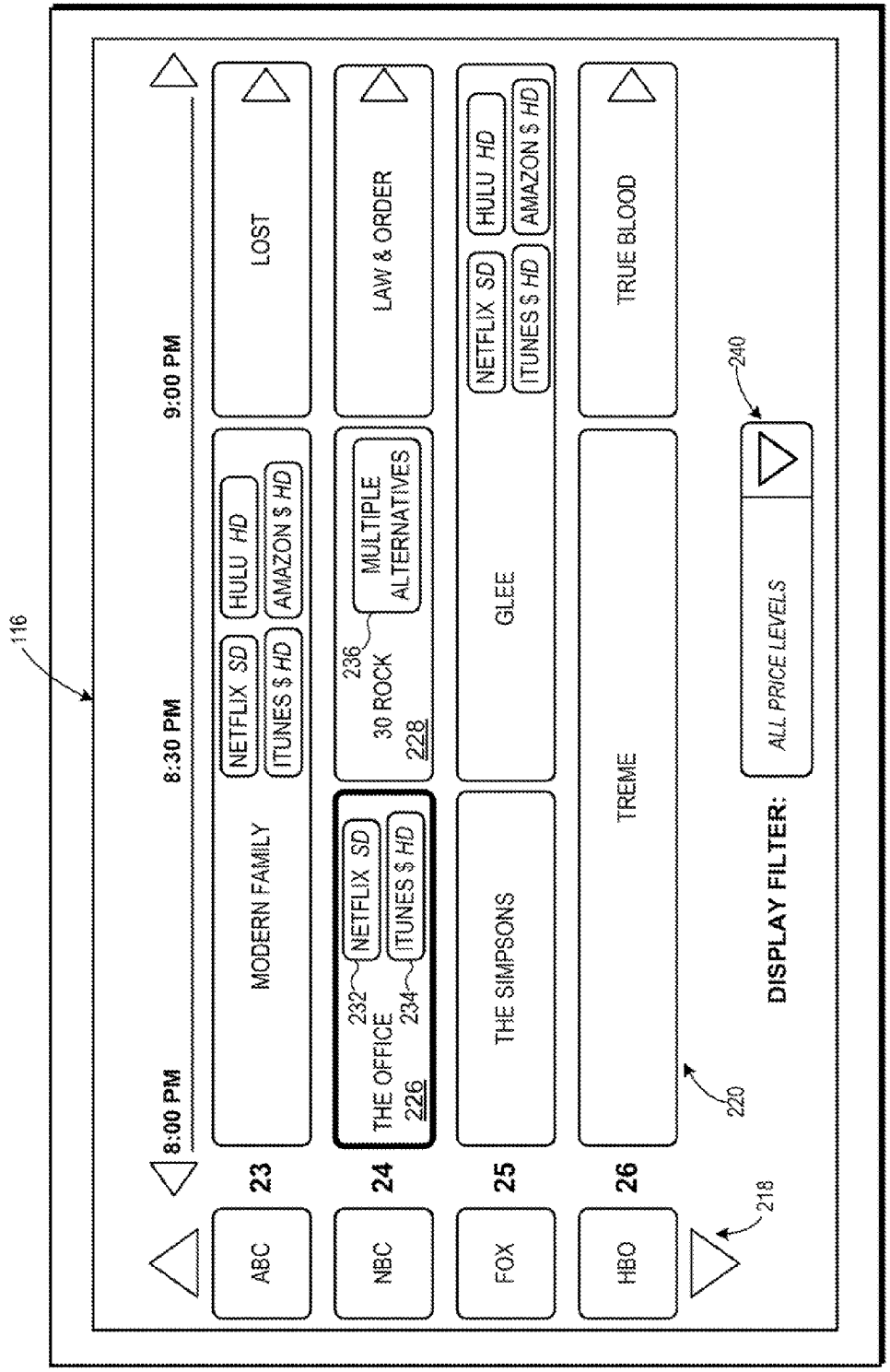
FIG. 2 is a diagram illustrating an example alternative configuration of the electronic program guide of FIG. 1 in accordance with at least one embodiment of the present disclosure.

FIG. 2 illustrates another example configuration of the EPG 116 in accordance with at least one embodiment of the present disclosure. The embodiment of the EPG 116 in FIG. 2 includes a navigable display 218 of the channels available from the primary content source and a navigable display 220 of the current program lineup from the primary content source as similarly described above with reference to the navigable displays 118 and 120 of FIG. 1. However, rather than use a separate navigable display for alternative-source versions of a selected multimedia program, in this depicted embodiment the EPG 116 uses visual indicators of the availability of alternative-source versions of a multimedia program within the program icon for that same multimedia program in the navigable display 220 of the current program lineup.

To illustrate, the program icon 226 associated with a multimedia program entitled "The Office" can include an availability icon 232 identifying the multimedia program having an version alternatively available from the "Netflix"™ OTT content source and an availability icon 234 identifying the multimedia program as having a version alternatively available from the "iTunes"™ OTT content source. Moreover, the program icons can include visual indicators to indicate various specific availability parameters for the alternative-source versions of the multimedia program. For example, the availability icon 232 can include a sub-icon depicting the acronym "SD" to reflect that this version of the multimedia program is a standard definition version, and the availability icon 234 can include a sub-icon depicting a dollar sign ($) and a sub-icon depicting the acronym "HD" to reflect that this version of the multimedia program has an access prices and is available in high definition. As another example, the program icon 228 associated with the multimedia program entitled "30 Rock" can include an availability icon 236 identifying that the multimedia program is alternatively available from multiple alternative content sources. The availability icon 236 thus can include, for example, a visual depiction of the phrase "Multiple Alternatives."

Other availability parameters may be visually depicted within the program icons using any of a variety of visual signifiers. As an example, colors, shading, or certain border formats for the program icons may be used to convey alternative-source options for multimedia programs displayed in the EPG 116. To illustrate, the program icons displayed in the navigable display 220 may have different background colors or different border colors based on whether the corresponding multimedia program has an alternative-content source. Moreover, program icons may have a particular shade of the color, or a particular border feature (e.g., thicker border lines) to indicate the characteristics of the alternative-content source. For example, those multimedia programs available from a different content source may have a background color of green whereas multimedia programs without an alternative content source have a background color of blue, and those multimedia programs having an alternative content source that sources the multimedia program for free, or at a higher picture resolution, may also have thicker border lines. As such, a user can quickly ascertain at a glance the availability status of multimedia programs listed in the EPG 116. The user then may select the program icon for a multimedia program of interest to direct the EPG 116 to display additional information for the multimedia program, such as in the navigable display 132 of FIG. 1 described above. Other examples of such visual parameters that signal to the user that the multimedia program associated with the program icon is available from one or more alternative content sources, or to signal that the availability of the multimedia program from alternative content sources will be ending soon, include a flashing program icon or flashing border, a stock-ticker-type scroll, and the like.

The availability icons presented in the program icons may be selectable by the user, whereby the EPG 116 is configured to initiate various actions in response to selection of an availability icon. For example, in response to the user's selection of the availability icon 232, the EPG 116 may open a web browser at the user equipment 104 (see FIG. 1) and direct the web browser to a uniform resource link ("URL") associated with the multimedia program at the "Netflix"™ website. As another example, in response to the user's selection of the availability icon 236, the EPG 116 could display another GUI depicting the various options available for obtaining a version of the corresponding multimedia program from alternative content sources and facilitating a user's selection of one of the various options. An example of such a GUI is described below with reference to FIG. 3.

Moreover, the EPG 116 depicted in FIG. 2 can employ a filter selection feature 240 that enables the user to limit the displayed alternative-source availability information to one or to a subset of dimensions or attributes. For example, the user can limit the display of alternative-source versions of the multimedia programs to only those of a certain resolution or display quality, to only those that are free or are below a certain price, to only those available from a specified subset of alternative content sources, and the like. As such, the filter selection feature 240 can be used by the user to further simplify the user's choices based on criteria considered more important by the user.

Although various configurations of the EPG 116 are described above with reference to FIGS. 1 and 2, the EPG 116 is not limited to these example configurations, but rather may be implemented in any of a variety of configurations that provide both a depiction of a multimedia program available from a primary content source via a current program lineup or other multimedia program list or matrix display and a depiction of the confirmed or estimated availability metadata for the alternative-source versions of the multimedia program. To illustrate, the EPG 116 may implement a pop-up window, a picture-in-picture window, or a hierarchy of user-navigable windows to depict this information. As another example, rather than display both the current program lineup from the primary content source and the availability metadata for alternative content sources on the same display screen, the user equipment 104 may integrate, or be coupleable to, a second display, and the EPG 116 may be spread over both displays such that the program metadata may be presented via the main display and the availability metadata may be presented via the second display. For example, the user equipment 104 may be implemented as a set-top box coupleable to a television and coupleable to a remote control device with an integrated display, and the EPG 116 may be configured such that the current program lineup for the primary content source is depicted on the television and the availability metadata for alternative content sources is transmitted to the remote control device for display on the integrated display.

Figure 3:
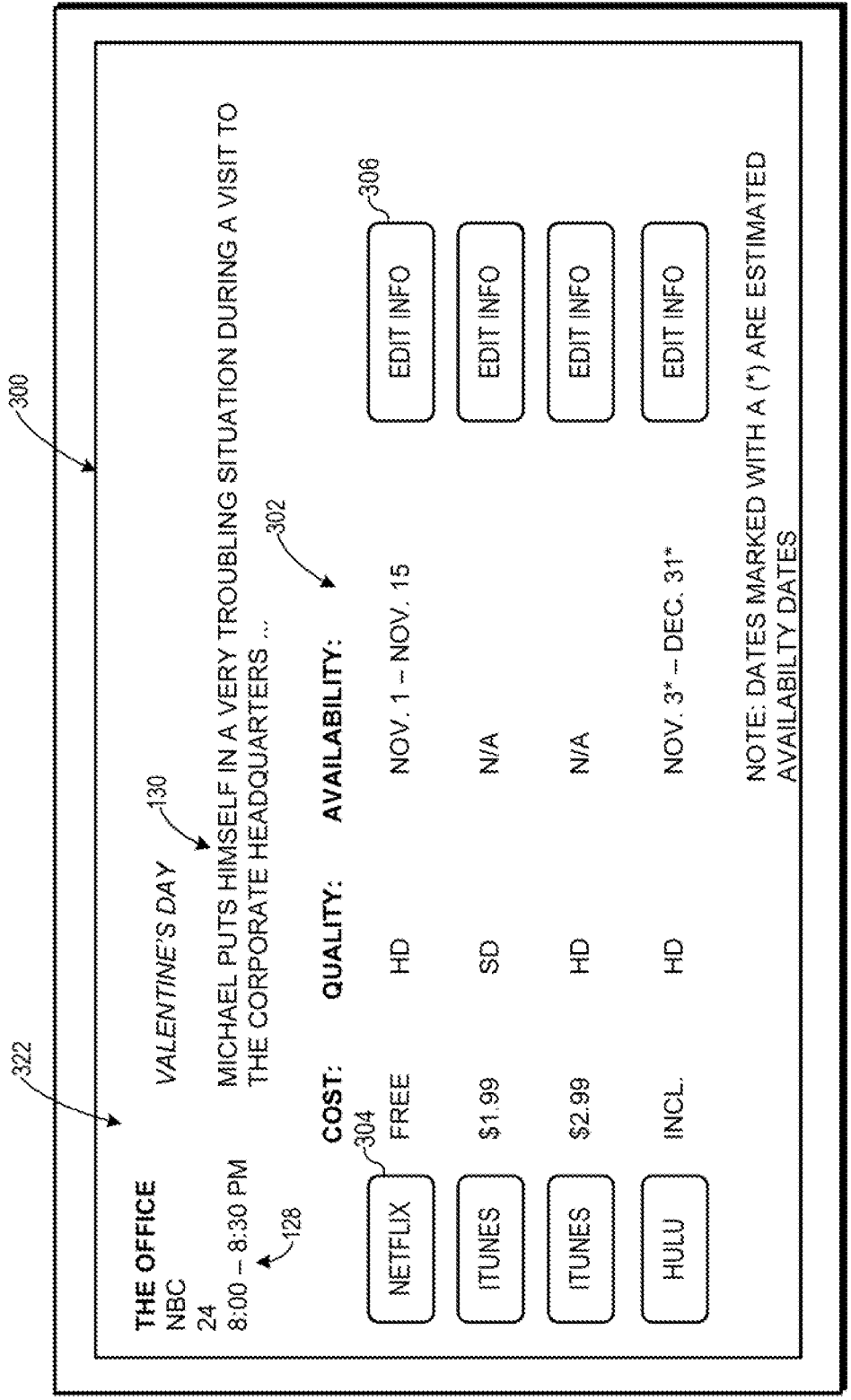
FIG. 3 is a diagram illustrating an example graphical user interface of the electronic program guide of FIG. 1 for presenting alternative-source versions of an identified multimedia program in accordance with at least one embodiment of the present disclosure.

FIG. 3 depicts an example GUI 300 for presenting various options for versions of an identified multimedia program from alternative content sources in accordance with at least one embodiment of the present disclosure. The GUI 300 may be presented by the EPG 116 (see FIGS. 1 and 2) in response to the user's selection of a program icon from a navigable display of the current program lineup, in response to the user's selection of an availability icon (such as icons 232, 234, or 236 of FIG. 2) within a program icon in the navigable display of the current program lineup, or in response to the user's selection of one of the selectable availability icons 134, 136, 138, and 140 of the navigable display 132 of FIG. 1.

The depicted GUI 300 can include a display of program metadata 322 associated with a multimedia program selected by the user from the current program lineup, whereby the depicted program metadata 322 can include, for example, the general program metadata 128 (see FIG. 1), such as the name of the series if the selected multimedia program is an episode of the series, the broadcaster or producer of the selected multimedia program, the channel on which the selected multimedia program is available, and the scheduled start time and end time of the multimedia program, as described above. The depicted program metadata also can include, for example, the synopsis metadata 130 (see FIG. 1) that presents, for example, the title of the episode if the multimedia program is an episode of a series, a synopsis of the multimedia program, the actors appearing in the multimedia, the date of first airing, and the like.

The GUI 300 further can include a user-navigable display 302 presenting the estimated or confirmed availability of alternative-source versions of an identified multimedia program. This user-navigable display 302 can, for example, take the form of a table, grid, or matrix that lists various availability parameters for each alternative-source version of the multimedia program. Such availability parameters can include, for example, the price to access the alternative version, the quality of the alternative version, the availability date range (including one or both of an availability start date and an availability end date) of the alternative version, and the like. Further, each alternative version of the multimedia program can include a selectable icon or other selectable GUI feature (e.g., selectable icon 304) that the user can select to initiate access to the corresponding alternative version. For example, in response to the view selecting or otherwise manipulating the selectable icon 304, the GUI 300 initiates access to a webpage of the "Netflix"™ website that is associated with the version of the multimedia program available from the "Netflix"™ website.

As noted above, information presented by the display of the program metadata or by the availability metadata may be inaccurate due to dynamic changes in the current program lineup, errors in estimating availability parameters, and the like. Accordingly, the GUI 300 can include user-navigable features to facilitate user feedback identifying potentially erroneous depicted information. To illustrate, the GUI 300 can include a selectable icon 306 for each alternative-source version option presented in the user-navigable display 302. When a user "selects" a selectable icon 306 in the GUI 300, the GUI 300 initiates the display of a user feedback GUI that may be used to obtain the user's feedback on potentially inaccurate displayed information, whereby such feedback can include, for example, flagging the information for review by an administrator, or the feedback can include, for example, user-proposed corrections to the displayed information. Techniques for obtaining this user feedback are described in greater detail below.

Figure 4:
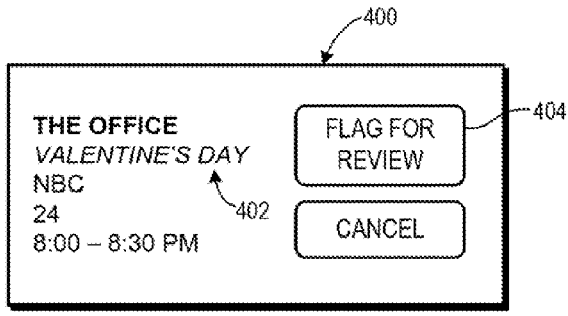
FIG. 4 is a diagram illustrating an example graphical user interface of the electronic program guide of FIG. 1 for user-initiated flagging of program metadata for review in accordance with at least one embodiment of the present disclosure.
Figure 5:
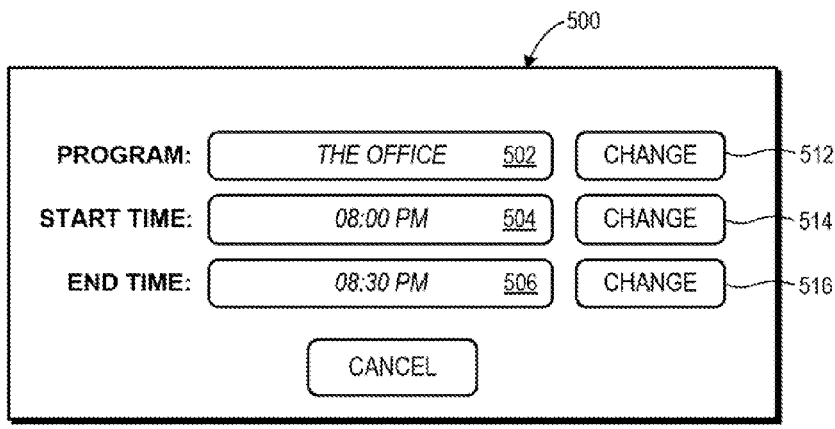
FIG. 5 is a diagram illustrating an example user interface of the electronic program guide of FIG. 1 for user-initiated correction of linear-program metadata in accordance with at least one embodiment of the present disclosure.
Figure 6:
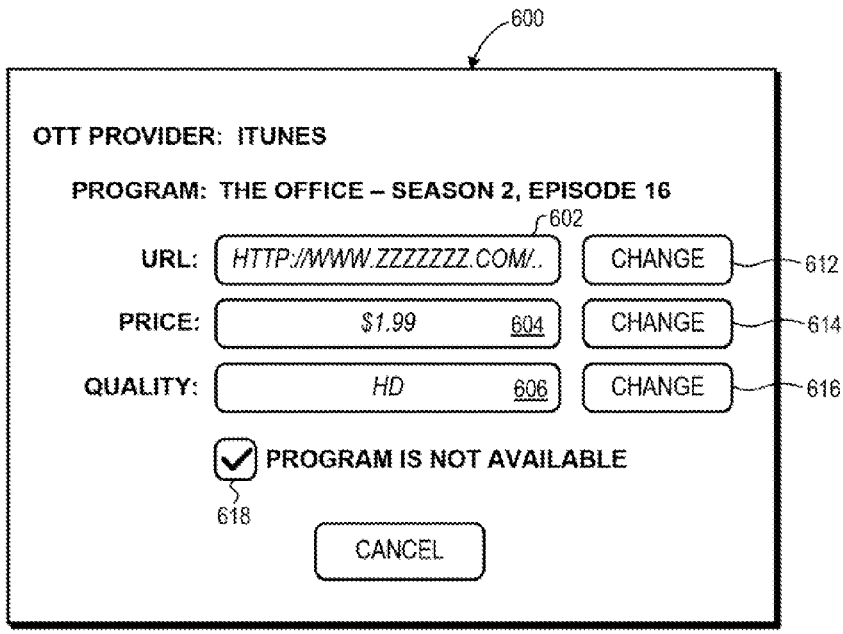
FIG. 6 is a diagram illustrating an example user interface of the electronic program guide of FIG. 1 for user-initiated correction of over-the-top program metadata in accordance with at least one embodiment of the present disclosure.

FIGS. 4 through 6 illustrate various GUIs that may be presented by the EPG 116 (see FIGS. 1 and 2) in response to user input indicating a desire to correct potentially inaccurate metadata presented within the EPG 116. As described below, the user feedback obtained via feedback GUIs, such as those illustrated in FIGS. 4 through 6, may be used either to signal review and correction of program metadata by an administrator or to initiate an automated process to correct the inaccurate metadata.

In the example of FIG. 4, a GUI 400 can be presented to the user in response to the user's selection of a multimedia program from, for example, the current program lineup displayed by the EPG 116. The GUI 400 includes a display 402 of the current program metadata for the selected multimedia program and a review icon 404 that the user may select to flag or otherwise signal that the displayed program metadata may be erroneous and in need of administrative review and correction. For example, a user may notice that the displayed multimedia program has a delayed start due to the previous multimedia program on the same channel having overrun its assigned time slot. In response, the user may select the multimedia program and then select the review icon 404 to indicate that the displayed program metadata is no longer accurate (in that the start time needs to be shifted). In response to the user's selection of the review icon 404, the EPG 116 transmits a review flag indicator to the service-provider network 102 (see FIG. 1). This review flag indicator then may be used to trigger review and correction of the program metadata by an administrator of the service-provider network 102.

FIG. 5 illustrates a GUI 500 presented to the user in response to the user's selection of a selectable icon of the EPG 116 that indicates the user's intent to submit a proposed correction to program metadata displayed by the EPG 116. In the depicted example, the GUI 500 is presented by the EPG 116 in response to the user signaling an intent to edit the program metadata associated with a multimedia program selected from the displayed current program lineup. The GUI 500 includes one or more user-input fields in which the program metadata are presented and in which the user can modify, enter, or select a proposed change to the presented metadata. In one embodiment, the user-input fields initially present the current metadata for the user's reference. For example, the GUI 500 can include user-input fields 502, 504, and 506 that present the current program title, the current start time, and the current end time, respectively. Should the user desire to submit a correction to the program title, the user can manipulate the user-input field 502 to provide the proposed correction to the title and then select a corresponding change icon 512 to cause the EPG 116 to submit the user's proposed corrected title to the service-provider network 102. Likewise, should the user desire to submit a correction to the start time, the user can manipulate the user-input field 504 to provide the proposed correction to the start time and then select a corresponding change icon 514 to cause the EPG 116 to submit the user's proposed corrected start time to the service-provider network 102. The user can interface with the user-input field 506 and a corresponding change icon 516 in a similar manner to submit a proposed corrected end time. The user-input fields can include any of a variety of input fields, such as a text entry field, a pull-down list, a navigable calendar field, and the like.

FIG. 6 illustrates a GUI 600 presented to the user in response to the user's selection of a selectable icon of the EPG 116 that indicates the user's intent to submit a proposed correction to availability metadata for alternative-source versions of a multimedia program displayed by the EPG 116. In the depicted example, the GUI 600 is presented by the EPG 116 in response to the user signaling an intent to edit the availability metadata associated with a multimedia program selected from the displayed current program lineup. The GUI 600 includes one or more user-input fields in which the alternative availability metadata are presented and in which the user can enter or select a proposed change to the presented metadata. In one embodiment, the user-input fields initially present the current metadata for the user's reference. For example, the GUI 600 can include user-input fields 602, 604, and 606 that present the current URL or other network location at which the data for the multimedia program is purported to be found, the purported price for the user to access the multimedia program from the alternative content source, and the purported quality of the represented version of the multimedia program (e.g., "HD" or "high definition"), respectively. Should the user desire to submit a correction to the listed network location, the user can manipulate the user-input field 602 to provide the proposed correct network location and then select a corresponding change icon 612 to cause the EPG 116 to submit the user's proposed corrected network location to the service-provider network 102. Likewise, should the user desire to submit a correction to the purported price, the user can manipulate the user-input field 604 to provide the proposed corrected price and then select a corresponding change icon 614 to cause the EPG 116 to submit the user's proposed corrected price to the service-provider network 102. The user can interface with the user-input field 606 and a corresponding change icon 616 in a similar manner to submit a proposed corrected quality.

Further, the availability of the multimedia program from an alternative content source may be estimated based on an analysis of historical availability data or from contractual arrangement information. As the availability in this case is an estimate, there is potential for the multimedia program to be inaccurately represented as currently available from the subject alternative content source. Accordingly, the GUI 600 may include one or more user-input fields by which the user can signal a need to correct the representation of the availability of the multimedia program. In the example of FIG. 6, the GUI 600 can include a user-input field 618 (e.g., in the form of a radio button or a check box) that the user can select to provide feedback that the identified multimedia program is, to the user's knowledge, not available from the alternative content source. In response to the user manipulating this field, the EPG 116 can submit a flag to the service-provider network 102 to indicate that the user has indicated that the multimedia program is not currently available, in contrast to the current availability indicated by the presented availability metadata in the EPG 116.

Figure 7:
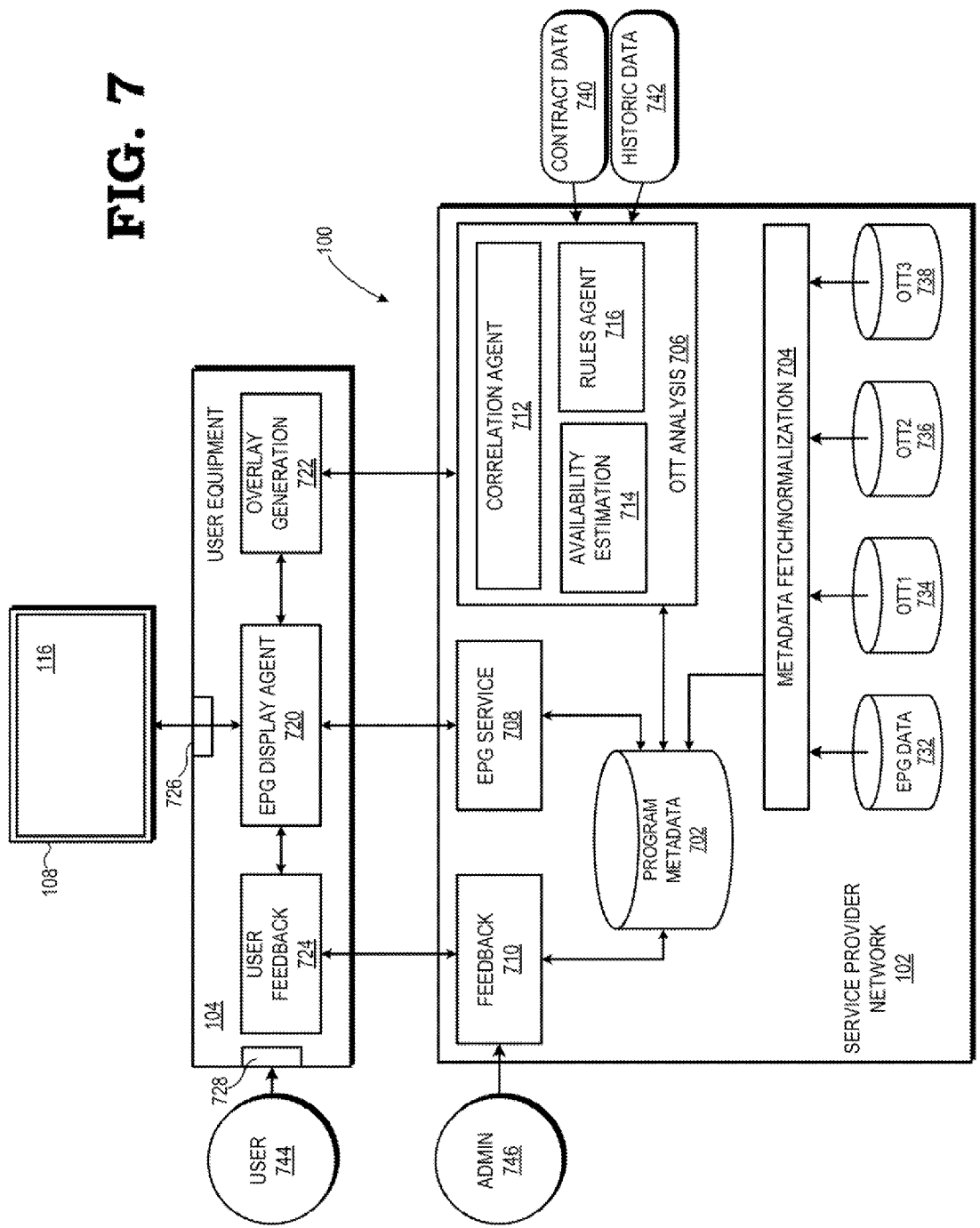
FIG. 7 is a diagram illustrating an example implementation of the multimedia-content distribution system of FIG. 1 in accordance with at least one embodiment of the present disclosure.

FIG. 7 illustrates an implementation of the multimedia-content distribution system 100 of FIG. 1 in accordance with at least one embodiment of the present disclosure. As shown, the service-provider network 102 includes a program datastore 702 (e.g., a database or other data-storage structure), a metadata fetch and normalization agent 704, an OTT analysis agent 706, an EPG service agent 708, and a feedback agent 710 (hereinafter, "agents 704 through 710"). The agents 704 through 710 may be implemented as one or more separate devices distributed in a network. Alternatively, some or all of the agents 704 through 710 may be implemented in the same device. The user equipment 104 includes an EPG display agent 720, an overlay generation agent 722, a user feedback agent 724, and a display interface 726 coupled to, or coupleable to, the display 108 (see FIG. 1) upon which the EPG 116 (see FIG. 1) is displayed. The user equipment 104 further includes a user input interface 728 (e.g., a remote control interface, interface panel, touchscreen, keyboard, etc.) to receive commands and other input from the user 744. The functionality ascribed herein to the various agents may be implemented via hardcoded logic (e.g., in an application-specific integrated circuit or in a programmable-logic device), via one or more processors executing software to implement certain functionality, or via a combination thereof.

In operation, the metadata fetch and normalization agent 704 fetches or otherwise obtains program metadata from the various content sources accessible via the service-provider network 102. This program metadata can include, for example, EPG data 732 for a linear-television content source, such as EPG data provided as a service by Tribune Media Services™. The program metadata also can include, for example, OTT program lineup data 734, 736, and 738 for OTT content sources denoted OTT1, OTT2, and OTT3, respectively. The OTT program lineup data may be obtained by the metadata fetch and normalization agent 704 by, for example, scanning or analyzing the websites through which the OTT content sources provide multimedia programs or by accessing the data via a backend portal into the OTT content sources. For example, Netflix™ provides an application programming interface ("API") through which a software application may make API calls to obtain program metadata for the current lineup of multimedia programs available from the Netflix™ OTT service. The metadata fetch and normalization agent 704 therefore may use this API to access the program metadata from the Netflix™ OTT service. Upon receipt of program metadata from a content source, the metadata fetch and normalization agent 704 normalizes the program metadata to a specified data format and stores the formatted program metadata in the program datastore 702.

The OTT analysis agent 706 operates to match, or correlate, multimedia programs listed for the different content sources as versions of the same multimedia program. In order to do so, the OTT analysis agent 706 identifies each multimedia program listed in the current program lineup of the primary content source (e.g., the linear-television content source) and then searches the program metadata of the alternative content sources using various search criteria to identify analogues of the identified multimedia program in the program metadata from the alternative content sources. This search can include external searches whereby the websites or other external interfaces provide by the alternative content sources are searched for matches. This search also may include internal searches of the program metadata represented in the program datastore 702. To illustrate, upon identifying a multimedia program with a series title of "Family Guy," an episode title of "Blue Harvest," and a season identifier of "season 6," the correlation agent 712 may search for multimedia programs with similar identifiers and determine a confidence score based on a degree of matching between the original identifiers and the identifiers associated with a multimedia program under analysis. In the event that the confidence score exceeds a threshold, the correlation engine 712 may update the program datastore 702 to reflect that the multimedia program under analysis is the same multimedia program as that selected from the current program lineup and thus may be presented as an alternative-source version option. The correlation engine 712 further may access various program metadata and availability metadata from alternative content sources and populate the program datastore 702 accordingly.

In certain instances, certain availability parameters for a multimedia program from an alternative content source may not be explicitly defined or expressly available from the alternative content source or from a third party entity. To compensate, the availability estimation agent 714 operates in conjunction with the rules agent 716 to estimate these missing availability parameters based on an analysis of various data, such as contract data 740 and historic data 742. The rules agent 716 is programmed with various rule sets representing observed or expressed relationships between the availability parameters for multimedia programs from alternative content sources and certain events, such as the airing of a multimedia program on a television broadcast channel, the scheduling of a sporting event, a priori knowledge of the typical delay between the occurrence of a sporting event and the availability of its recording from one or more OTT content sources, and the like.

The contract data 740 represent contractual arrangements between the alternative content source and a producer, owner, or other entity that controls the distribution of multimedia programs. These contractual arrangements thus may be represented by a set of rules that may be applied to a dataset to estimate when a multimedia program represented in the dataset will start to be available from the alternative content source, will cease being available from the alternative content source, the price to access the multimedia program from the alternative content source, and the like. For example, if the Hulu™ OTT service has an arrangement with the Fox Broadcasting Company™ that permits the Hulu™ OTT service to make episodes of the series "The Simpsons" available ten days after the episodes first air on the Fox™ television network, for a fee of $2.99, and available for only three days duration, then the rules agent 716 can be programmed with a rule set that represents this ten-day delay, three-day availability, and cost arrangement. Accordingly, when the availability estimation agent 714 identifies an air date of July 1 for the next episode of "The Simpsons," the availability estimation agent 714 may access the rule set from the rules agent 716 and apply it to the July 1 air date to estimate that the next episode of "The Simpsons" would have an availability start date of July 11, an availability end date of July 13, and at a fee of $2.99.

The historic data 742 represent an availability history of multimedia programs associated with, or representative of, the identified multimedia program. For example, if the multimedia program is an episode in a series, then the availability history represented by the historic data 742 can include a history of the relationships between when previous episodes in the series first aired by a linear-television content provider and when the previous episodes subsequently were available from alternative content sources, the durations that the previous episodes were available, or the prices set to access the previous episodes. By analyzing this availability history, the availability estimation agent 714 can develop a rule set used to determine estimated availability parameters in response to supplied input parameters. This rule set can reflect various metrics discernible from the availability history, such as the average or median delay between the first air date and the availability start date at an alternative content source, the average or median duration that the multimedia content is available at the alternative content source, the average price set by the alternative content source, and the like. The rule set further may be stored at the rules agent 716 for future reference.

Table 1 below illustrates an example database schema and example data for episodes of a series entitled "Glee" to represent the availability history between the air date of the episodes by the content owner and the OTT content source.

TABLE 1

| Season | Episode | Title | Subtitle | OTT | Owner | Air Date | Avail. Start Date | Avail. End Date |
|---|---|---|---|---|---|---|---|---|
| 3 | 1 | Glee | Purple . . . | Hulu | Fox | Jan. 3, 2012 | Jan. 11, 2012 | Jul. 3, 2012 |
| 3 | 2 | Glee | Unicorn . . . | Hulu | Fox | Jan. 10, 2012 | Jan. 17, 2012 | Jul. 7, 2012 |
| 3 | 3 | Glee | Asian . . . | Hulu | Fox | Jan. 17, 2012 | Jan. 26, 2012 | Jul. 16, 2012 |
| 3 | 4 | Glee | Pot of . . . | Hulu | Fox | Jan. 24, 2012 | Feb. 1, 2012 | Jul. 23, 2012 |

From this example, the delay between air date and availability date for this series is an average of 8 days, a median of 8 days, a minimum of 7 days, and a maximum of 9 days, and the availability duration has an average of 173 days, a median of 172 days, a minimum of 172 days, and a maximum of 174 days. As such, the rules set could take a conservative approach and estimate that Episode 5, scheduled to air on Jan. 31, 2012, would have an availability start date of 9 days later (Feb. 9, 2012) and availability end date of Jul. 30, 2012, or 172 days following the availability start date. A more aggressive rule set may estimate that Episode 5 would have an availability start date of 8 days later (Feb. 8, 2012) and an availability end date of Jul. 30, 2012, or 173 days following the availability start date.

For non-episodic programs, the availability history may be derived from previous airings of multimedia programs with one or more characteristics in common with the multimedia program at issue. For example, if the contractual arrangement between a content owner and an OTT content provider are not available, an estimate of the availability of a multimedia program may be determined from an availability history compiled for other multimedia programs owned by the same content owner and previously made available by the same OTT content provider. Other characteristics in common can include, for example, genre, length, actors, directors, producers, similar titles, resolution, price, etc.

In at least one embodiment, the availability estimation agent 714 utilizes a confidence level of the estimated availability parameters to decide whether to implement the estimated availability parameters as the availability metadata presented to the users via the EPG 116. If the confidence level is above a specified threshold, then the estimated availability parameters are stored in the program datastore 702 as the availability metadata for the multimedia program or the estimated availability parameters are provided to the user equipment 104 for display in association with the EPG 116, as described below. If the confidence level is below the specified threshold, then the estimated availability parameters are discarded. The confidence level for the estimated availability parameters can be determined, for example, by a statistical analysis of the available history, whereby a larger deviation in the mean or average availability delay or availability duration results in a lower confidence level, and vice versa. As another example, the confidence level may be determined from a comparison or cross-referencing of the estimated availability parameters with the contract rules, whereby the confidence level is modified based on the degree of similarity between the results of one or more existing contract rules and the estimated availability parameters. Moreover, as described below, an estimated availability parameter can be subsequently checked to determine whether it was accurate, and the confidence level for the next round of estimation can be weighted accordingly.

The EPG service agent 708 operates to access EPG data from the program datastore 702 and to provide the accessed EPG data to the EPG display agent 720 of the user equipment 104, whereupon the EPG data are used by the EPG display agent 720 to populate the data fields and display fields of the EPG 116 displayed by the user equipment 104. The accessed EPG data include program data representative of the multimedia programs in the current program lineup of the primary content source. In conjunction with the provision of the EPG data, the OTT analysis agent 706 accesses the availability metadata associated with the multimedia programs of the current program lineup and provides the availability metadata to the overlay generation module 722 of the user equipment 104. In one embodiment, the overlay generation module 722 generates an overlay for the displayed EPG to present the visual indicators of the availability of alternative-source versions of the listed multimedia programs, as described above with reference to the EPG 116 of FIGS. 1 and 2. In other embodiments, the availability metadata are supplied to the EPG service agent 708, which integrates the availability metadata into the EPG data supplied to the EPG display agent 720. A user 744 then may use a remote control device or other input interface to interact with the displayed EPG, whereby the user's interactions can include selecting a multimedia program from the current program lineup for presentation, selecting an alternative-source version of a multimedia program for presentation, providing user feedback to correct potentially inaccurate program metadata, and the like.

The feedback agent 710 of the service-provider network 102 and the user feedback agent 724 cooperate to facilitate user feedback on information presented in association with the EPG 116. As described above with reference to FIGS. 1 through 6, the EPG 116 can provide one or more GUIs or user-selectable icons or other features to allow a user to identify potentially inaccurate information displayed by the EPG 116, either through a "flag for review" mechanism intended to spur an administrator 746 to review the associated program metadata and correct as necessary or through a correction feedback mechanism whereby the user is solicited to propose the actual correction to the presented information, such as by soliciting the user to provide a corrected start time, a corrected end time, or a corrected price in place of the information for these parameters which the user believes to be inaccurate. Accordingly, when the user 744 manipulates the EPG 116 to provide such user feedback, the user feedback agent 724 forwards an indicator of the user feedback to the feedback agent 710 of the service-provider network 102. In response, the feedback agent 710 logs the user-feedback indicators in a database or other datastore. In one embodiment, the user feedback for a particular program metadata, or a threshold number of instances of user feedback for a particular program metadata, triggers the routing of an alert to a queue overseen by the administrator 746, thereby initiating a review of the item of information by the administrator 746 in turn. If the administrator deems the information to be inaccurate, then the administrator 746 can update the corresponding program metadata in the program datastore 702, thereby addressing the issue. In embodiments whereby the users are enabled to propose actual corrections to the metadata, a threshold number of consistent proposed corrections may be used to trigger an automatic correction to the metadata by the feedback agent 710 (that is, without intervention on the part of the administrator 746), thereby leveraging crowd-sourcing capabilities to correct or update EPG metadata without the delay or complications of manual review and correction by the administrator 746.

Figure 8:
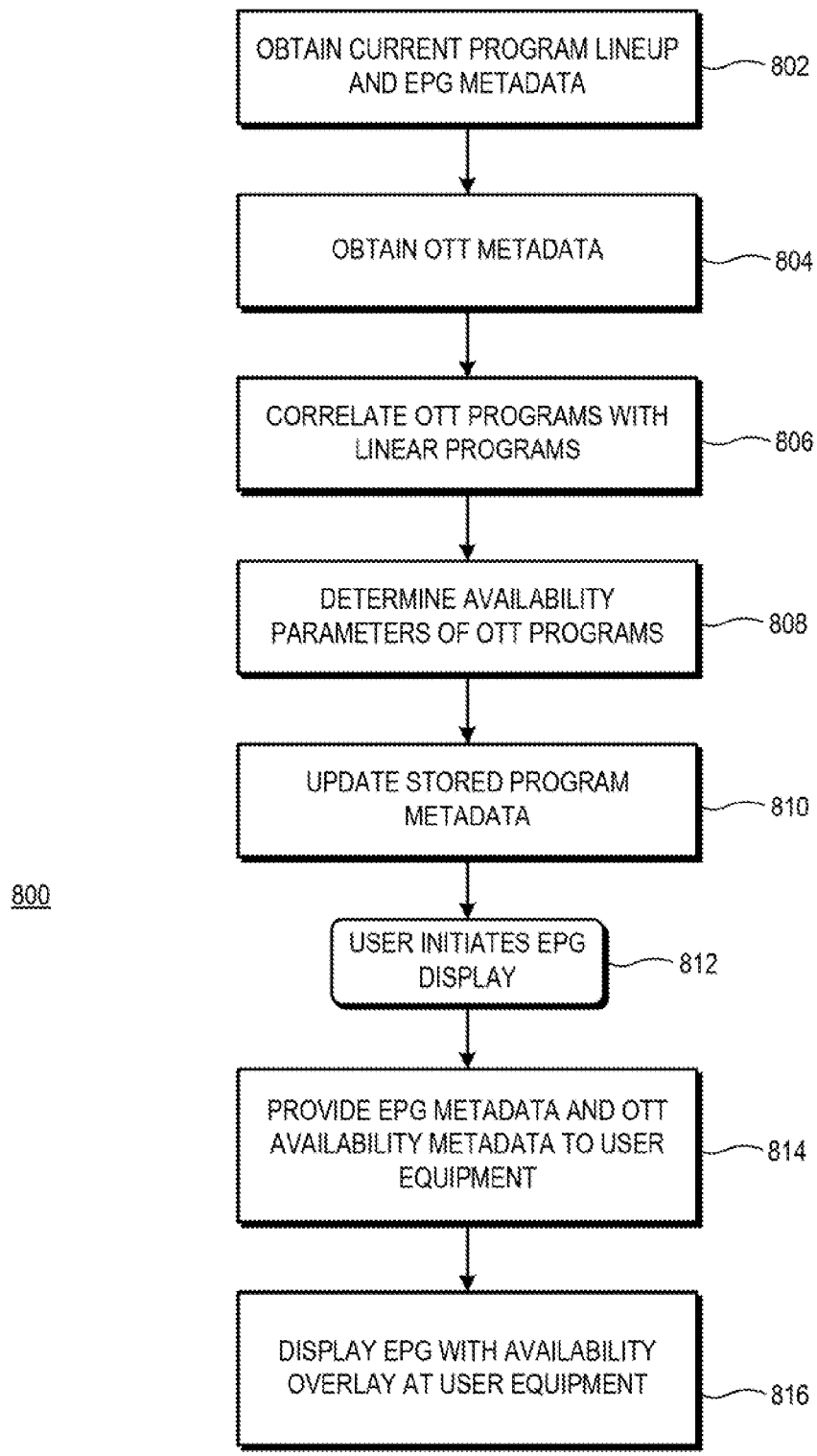
FIG. 8 is a flowchart illustrating an example method for coordinating display of alternative-source versions of multimedia programs for display with an electronic program guide in accordance with at least one embodiment of the present disclosure.

FIG. 8 depicts a method 800 for providing an EPG that presents alternative sources of multimedia programs listed in a current program lineup of the EPG in accordance with at least one embodiment of the present disclosure. For ease of discussion, the method 800 is described in the example context of the EPG 116 of FIGS. 1 and 2 and the implementation of the multimedia-content distribution system 100 of FIG. 7. Moreover, the method 800 is described in an embodiment whereby a linear-television content source is the primary content source and OTT content sources are the alternative content sources.

The method 800 initiates at block 802, whereby the metadata fetch and normalization agent 704 obtains current program lineup metadata for the linear-television content source and stores the program lineup metadata in the program datastore 702. At block 804, the metadata fetch and normalization agent 704 obtains current program lineup metadata from one or more OTT content sources and stores the current program lineup metadata in the program datastore 702. At block 806, the correlation agent 712 identifies multimedia programs from the current program lineup of the linear-television content and searches the program datastore 702 and external sources to identify corresponding matching versions of the multimedia programs available from the OTT content sources.

At block 808, the availability estimation agent 714 and the rules agent 716 determine the availability parameters of the matching multimedia programs from the OTT content sources. In some instances, the availability parameters may be expressly identified in the program metadata obtained from the OTT content sources. However, in other instances, availability metadata may be missing or unavailable, and in such instances the availability estimation agent 714 and the rules agent 716 apply one or more sets of rules to contract data 740 and historic data 742 to estimate the missing or unavailable availability parameters. An example method for the process of block 808 is described below with reference to FIG. 9.

At block 810, the OTT analysis agent 706 updates the program datastore 702 to reflect the identified matches between multimedia programs of the current program lineup and multimedia programs available from the OTT content sources, as well as to update previously missing or inaccurate availability metadata for the multimedia programs available from the OTT content sources.

At block 812, a user interfaces with the user equipment 104 to initiate display of the EPG 116. In response, at block 814 the EPG service agent 708 accesses EPG metadata from the program datastore 702 and provides the EPG metadata to the EPG display agent 720 for use in generating a user-navigable EPG for display to the user. The EPG metadata include program metadata for a current program lineup for the linear-television content provider, which is displayed in a grid or matrix form in the EPG 116. Moreover, as certain multimedia programs listed in the current program lineup may have alternative versions available from one or more OTT content sources, the correlation agent 712 provides alternative availability metadata to the overlay generation agent 722, which generates an overlay for the EPG 116 to present or depict visual indicators of these alternative sources of the listed multimedia programs. At block 816, the EPG display agent 720 provides the EPG 116 with the overlay for display at the display 108 coupled to the user equipment 104. The user then may navigate the EPG 116 to select a multimedia program from the linear-television content provider or an alternative version of the multimedia program from an OTT content source, if available, for presentation by the user equipment 104.

Figure 9:
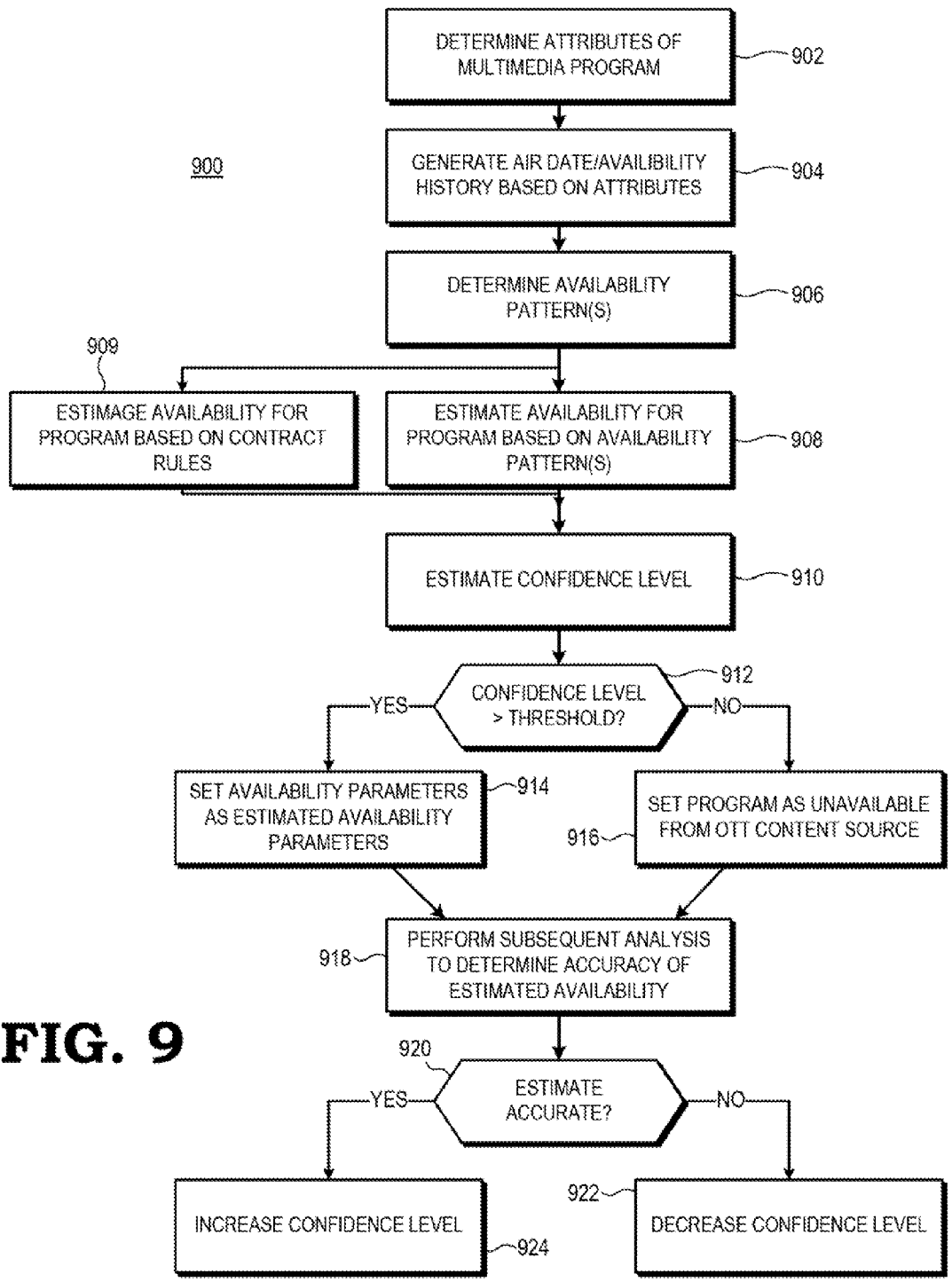
FIG. 9 is a flowchart illustrating an example method for estimating availability metadata for an alternative-source version of a multimedia program in accordance with at least one embodiment of the present disclosure.

FIG. 9 illustrates an example method 900 for estimating availability parameters for an alternative-source version of a multimedia program in accordance with at least one embodiment of the present disclosure. For ease of discussion, the method 900 is described in the example context of the EPG 116 of FIGS. 1 and 2 and the implementation of the multimedia-content distribution system 100 of FIG. 7. Moreover, the method 900 is described in an embodiment whereby a linear-television content source is the primary content source and OTT content sources are the alternative content sources.

The method 900 initiates at block 902, whereby the availability estimation agent 714 selects an unanalyzed multimedia program and determines one or more attributes of the selected multimedia program to be used in preparing an availability history for the multimedia program. The attributes of the selected multimedia program can include, for example, the title of the multimedia program, the type or genre of the multimedia program (e.g., sporting event, television show, movie, comedy, drama, etc.), the length of the multimedia program, the owner or producer of the multimedia program, the age or original air date of the multimedia program, actors, directors, or producers associated with the multimedia program, the resolution or video quality, the price to access the multimedia program, and the like. If the multimedia program is an episode of a series, then the attributes further can include a season number, an episode number, a series title, and the like. At block 904, the availability estimation module 714 uses the identified attributes to identify similarly-situated multimedia programs that have previously aired and to develop an availability history reflecting the air dates of these other multimedia programs and their subsequent availabilities at the OTT content source at issue. This availability history can be implemented as one or more tables or data structures arranged around a separate axis for each identified attribute. For example, the availability history can include an availability history subset pertaining to other multimedia programs of the same genre, an availability history subset pertaining to other multimedia programs from the same content owner, and the like. The availability history may represent other availability patterns, such as the prices charged for similar multimedia programs made available by the OTT content source.

At block 906, the availability estimation module 714 attempts to determine patterns in previous airings of related multimedia programs, the subsequent dates that the related multimedia programs next became available from the OTT content source, as well as a pattern in the duration that the related multimedia programs were available from the OTT content source. The estimated patterns instead may reflect, for example, a pattern in the prices charged for multimedia programs with similar attributes and made available from the OTT content source. This pattern estimation may be separately determined for each dimension of attributes, for a different subsets of attributes, and the like.

At block 908, the availability estimation module 714 estimates the availability parameters for the selected multimedia program based on an analysis of the one or more patterns discerned at block 906. In one embodiment, the availability parameters may be estimated based on a weighted combination of the multiple patterns, whereby patterns for attributes deemed to be more likely to reflect the actual availability pattern are weighted more heavily than patterns for attributes deemed to be less likely to reflect the actual availability pattern. For example, an availability pattern determined based on previous episodes of the same series is likely to be more accurate than an availability pattern determined based on the availability history of other multimedia programs of the same length or having the same lead actor, and thus these two different availability patterns are weighted accordingly. The availability parameters may be calculated by using the single best availability pattern (e.g., the availability pattern determined from a history of previous episodes in the same series) or as, for example, a weighted averaging of two or more availability patterns (e.g., a weighted average of the average price for multimedia programs of the same genre as the selected multimedia program and the average price for multimedia programs owned by the same entity as the selected multimedia program).

As noted above, there may be a contractual arrangement or other arrangement that may specify when multimedia programs with similar characteristics (e.g., same content owner, same OTT source, same genre, and the like) are available with a corresponding OTT content source. Accordingly, concurrent with the process of blocks 906 and 908, at block 909 the availability estimation agent 714 can utilize the rule set maintained at the rules agent 716 to estimate a second source of availability parameters for the multimedia program based on an application of one or more of the contract rules from the rule set.

At block 910, the availability estimation agent 714 estimates a confidence level for the estimated availability parameters determined at block 908. This confidence level may be determined based on a statistical analysis of the deviations present in the one or more access patterns used to estimate the availability. Alternatively, the confidence level may be at least partially based on a correlation in the availability patterns discerned from different availability histories for different program attributes. In yet another embodiment the confidence level may be initially set to a specified level and then adjusted up and down based on the estimation performance of the availability estimation agent 714 for similar multimedia programs. In yet another embodiment, the confidence level may be at least partially based on a correlation between estimated availability parameters derived via the process of blocks 904, 906, and 908 and the second set of estimated availability parameters derived from the application of the contract rules via the process of block 909, such that a higher degree of similarity between these two estimates results in a higher confidence level.

At block 912, the availability estimation agent 714 compares the confidence level with a confidence threshold. If the confidence level does not exceed the confidence threshold, then at block 916 the availability estimation agent 714 discards the estimated availability parameters and either marks the multimedia program as unavailable from the OTT content source or marks the estimated availability parameters so that a disclaimer of the accuracy of the availability parameters is displayed by the EPG 116 if availability metadata are presented for the multimedia program in association with the OTT content source. Otherwise, if the confidence level exceeds the threshold, then at block 914 the availability estimation module 714 sets the availability parameters of the multimedia program to the estimated availability parameters.

In some embodiments, the availability estimation agent 714 can employ a feedback loop to improve its ability to estimate the availability parameters of alternative-source multimedia programs. To this end, the availability estimation agent 714 subsequently performs, at block 918, an analysis of its estimation capabilities by comparing one or more sets of the estimated availability parameters with the actual availability parameters that resulted to determine at block 920 whether the estimated availability parameters were relatively accurate. If the estimated availability parameters were not relatively accurate, then at block 922 the availability estimation agent 714 decreases the confidence level for the next round of estimated availability parameters (by, for example, decreasing a confidence factor used to weight successive confidence levels). If the estimated availability parameters were relatively accurate, then at block 924 the availability estimation agent 714 increases the confidence level for the next round of estimated availability parameters (by, for example, increasing the confidence factor).

Figure 10:
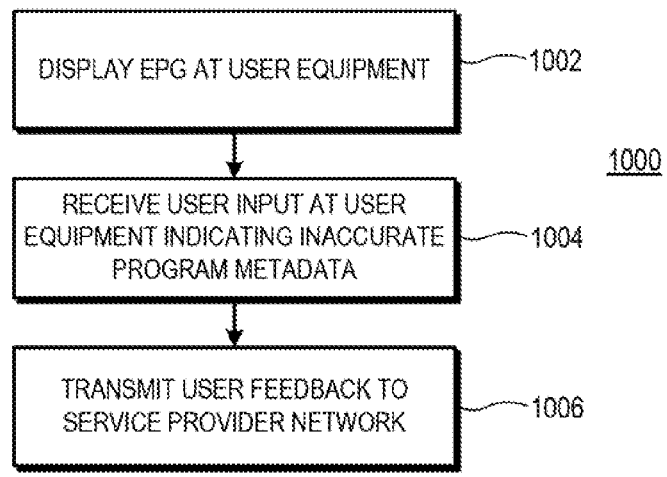
FIG. 10 is a flowchart illustrating an example method for obtaining user-initiated feedback on potentially inaccurate program metadata presented in an electronic program guide in accordance with at least one embodiment of the present disclosure.

FIG. 10 illustrates an example method 1000 for facilitating user feedback to correct potentially erroneous program information presented by an EPG in accordance with at least one embodiment of the present disclosure. For ease of discussion, the method 1000 is described in the example context of the EPG 116 of FIGS. 1 and 2 and the implementation of the multimedia-content distribution system 100 of FIG. 7.

The method 1000 initiates at block 1002, whereby the EPG service agent 708 provides EPG data to the EPG display agent 720, which uses the EPG data to display the EPG 116 at the user equipment 104. At block 1004, the user notes the display of program metadata that the user believes to be inaccurate, and in response the user interfaces with the EPG 116 to provide user feedback identifying or otherwise indicating the potentially incorrect program metadata. As noted above, the EPG 116 can provide one or more selectable features that present a GUI that the user may interface with to provide the user feedback, which may entail flagging certain information for review or which may entail soliciting the user to provide a proposed correction to the identified program metadata.

At block 1006, the EPG display agent 720 forwards the user feedback input to the user feedback agent 724, which then formats and transmits an indicator of the user feedback to the service-provider network 102. The service-provider network 102 then may initiate correction of the program metadata in response to, for example, a threshold number of user-feedback indicators for the program metadata at issue, or the user feedback may be queued for review and manual correction by the administrator 746.

Figure 11:
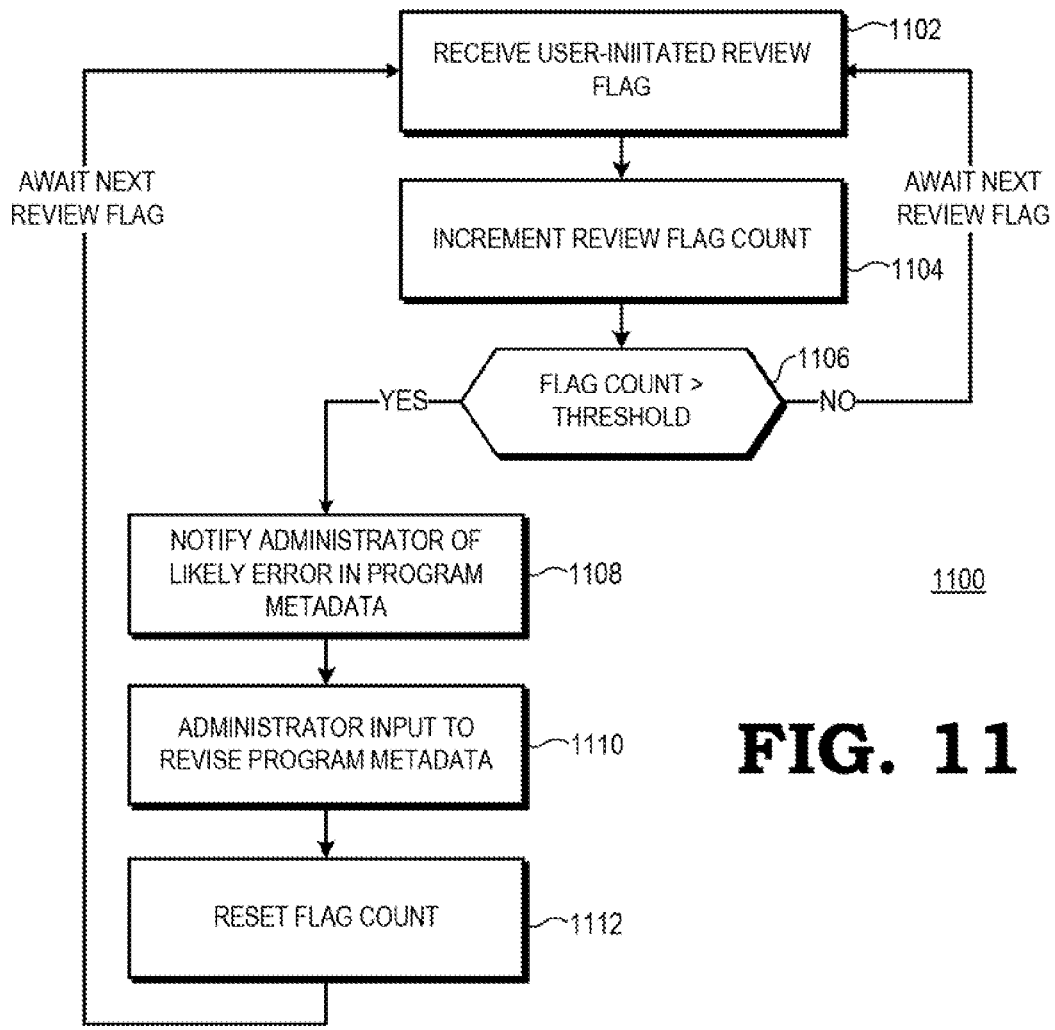
FIG. 11 is a flowchart illustrating an example method for initiating administrative review of potentially inaccurate program metadata presented in an electronic program guide in response to user-initiated review flagging in accordance with at least one embodiment of the present disclosure.
Figure 12:
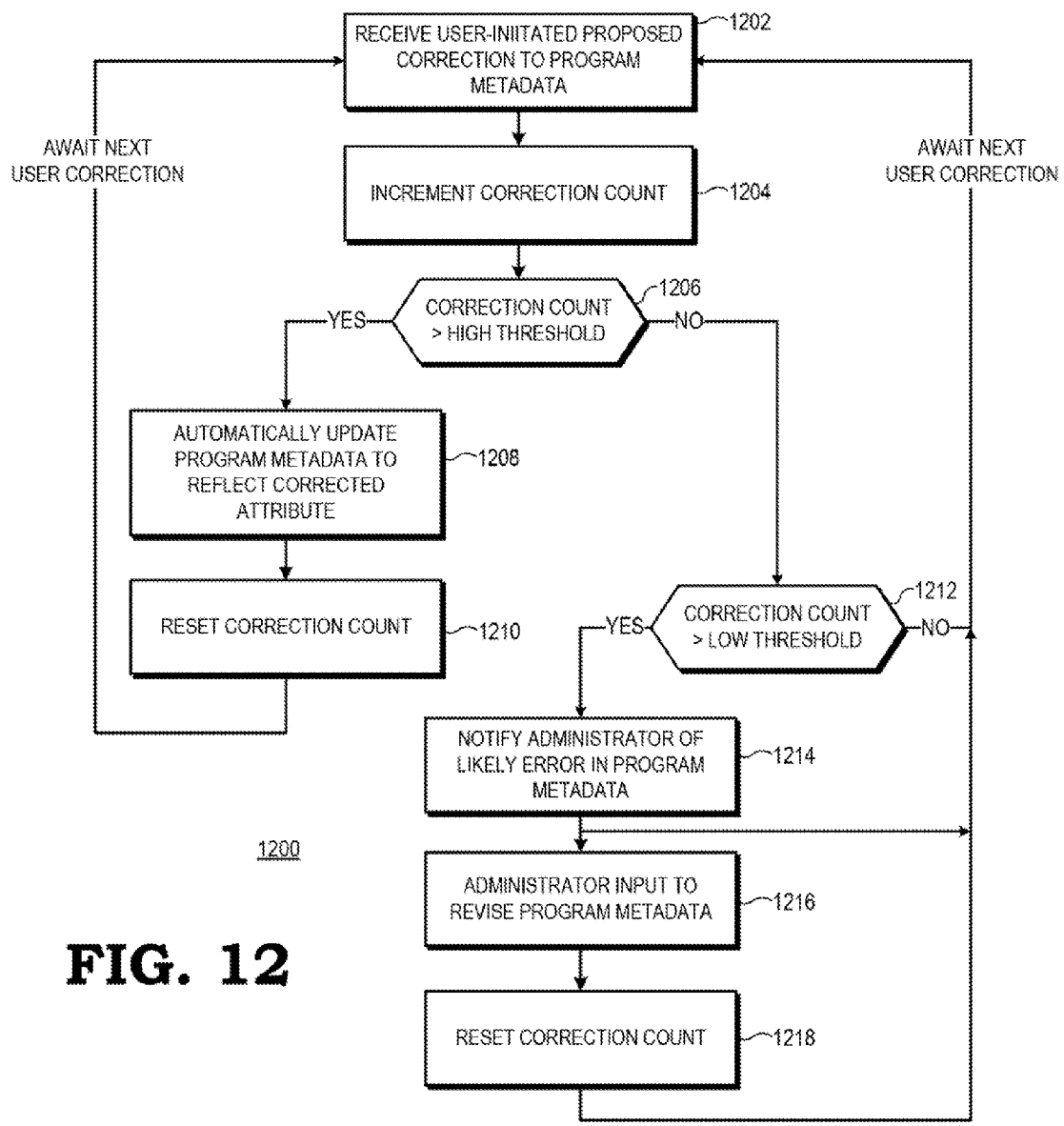
FIG. 12 is a flowchart illustrating an example method for initiating correction of potentially inaccurate program metadata presented in an electronic program guide in response to user-initiated correction feedback in accordance with at least one embodiment of the present disclosure.

FIGS. 11 and 12 depict example methods for utilizing user feedback to correct potentially erroneous program metadata presented via an EPG. For ease of discussion, the methods of FIGS. 11 and 12 are described in the example context of the EPG 116 of FIGS. 1 and 2 and the implementation of the multimedia-content distribution system 100 of FIG. 7.

The example method 1100 depicted by FIG. 11 is directed to manual correction of program metadata responsive to user-submitted review flags. At block 1102, the feedback agent 710 receives an indicator from the user equipment 104 indicating that the user has submitted (using, for example, the GUI 400 of FIG. 4) a user-initiated review flag for an item of information displayed via the EPG 116 at the user equipment 104. In response, at block 1104 the feedback agent 710 increments a review flag count associated with either the multimedia program associated with the item of information or the item of information itself. At block 1106, the feedback agent 710 compares the review flag count with a specified threshold. If the review flag count does not exceed the threshold, then no further action is taken, and the method 1100 returns to block 1102 to await the next user-initiated review flag for the program metadata. Otherwise, if the revise flag count exceeds the threshold, then it is likely that the program metadata contain an error, and thus at block 1108 the feedback agent 710 notifies the administrator 746 of the likely error in the program metadata by, for example, queuing a review action request for the administrator 746. In response, at block 1110 the administrator 746 reviews the program metadata and then interfaces with the feedback agent 710 to provide input to revise or to correct the program metadata, if necessary. The feedback agent 710 updates the program datastore 702 to reflect the revised program metadata. With the program metadata corrected, at block 1112 the feedback agent 710 resets the review flag to the initial count and then awaits the next user-initiated review flag.

The example method 1200 depicted by FIG. 12 is directed to facilitating either manual or automatic correction of program metadata based on proposed corrections submitted by one or more users. The method 1200 initiates at block 1202 whereby the feedback agent 710 receives an indicator from the user equipment 104 indicating that the user has submitted (using, for example, the GUI 500 of FIG. 5 or the GUI 600 of FIG. 6) a user-initiated proposed correction for an item of information displayed via the EPG 116 at the user equipment 104. In response, at block 1204 the feedback agent 710 increments a correction count associated with the item of information. Because users may submit inconsistent proposed corrections to program metadata (e.g., one user may propose shifting a start time of a multimedia program from 8:00 P.M. to 8:30 P.M. due to the previous multimedia program on the same channel running over its time slot, whereas another user may propose shifting the start time to 9:00 P.M.), in some embodiments, there may be multiple correction counts for an item of information, each correction count associated with a different proposed correction.

At block 1206, the feedback agent 710 compares the correction count with a specified high threshold. If the correction count exceeds the threshold, then the service-provider network 102 considers that a sufficient number of consistent user-initiated corrections have been received to implement, at block 1208, an automatic update or revision to the program metadata based on the proposed correction associated with the correction count. For example, if the threshold is 50 users submitting consistent proposed corrections to a price to access a multimedia program from an OTT content source, and if the feedback agent 710 receives 51 user-feedback submissions proposing to correct the listed price from $2.99 to $1.99, then the feedback agent 710 can automatically update the price metadata to reflect the revised price of $1.99 without engaging with, or requiring the intervention of, the administrator 746. At block 1210 the feedback agent 710 resets the correction count in view of the correction to the program metadata at block 1208.

Returning to block 1206, if the correction count does not exceed the high threshold, then at block 1212 the feedback agent 710 determines whether the correction count exceeds a lower specified threshold. If not, then the method returns to block 1202 to await the next user-initiated correction feedback. Otherwise, if the correction count exceeds the lower threshold, then at block 1214 the feedback agent 710 notifies the administrator 746 of the likely error in the program metadata by, for example, queuing a review action request for the administrator 746. While waiting for the administrator to respond, the method also in parallel returns to block 1202 to await the next correction count. In response to the review action request, at block 1216 the administrator 746 reviews the program metadata and then interfaces with the feedback agent 710 to provide input to revise or correct the program metadata, if necessary. The feedback agent 710 updates the program datastore 702 to reflect the revised program metadata. With the program metadata corrected, at block 1218 the feedback agent 710 resets the correction count to the initial count and then awaits the next user-initiated correction feedback.

In view of the many possible embodiments to which the principles of the present discussion may be applied, it should be recognized that the embodiments described herein with respect to the drawing figures are meant to be illustrative only and should not be taken as limiting the scope of the claims. Therefore, the techniques as described herein contemplate all such embodiments as may come within the scope of the following claims and equivalents thereof.

I claim:

1. A method comprising:
   identifying a multimedia program represented in an electronic program guide ("EPG") associated with a first content source;
   estimating an availability parameter for the multimedia program from a second content source;
   determining a confidence level for the estimated availability based on a confidence factor associated with at least one of the second content source and the multimedia program; and
   in response to the confidence level exceeding a specified threshold, providing an indicator of the estimated availability parameter for display with the EPG at a user equipment.

2. The method of claim 1 wherein the availability parameter comprises an element selected from the group consisting of: an availability of a version of the multimedia program from the second content source, an availability start date for the multimedia program from the second content source, an availability end date for the multimedia program from the second content source, and a price to access the multimedia program from the second content source.

3. The method of claim 1 wherein estimating the availability parameter for the multimedia program comprises estimating the availability parameter based on an application of one or more availability rules representative of a contractual agreement between an entity controlling the second content source and an entity controlling multimedia content represented by the multimedia program.

4. The method of claim 1 wherein estimating the availability parameter for the multimedia program comprises:
   identifying at least one related multimedia program having at least one characteristic in common with the multimedia program;
   determining an availability history representing a history for the at least one related multimedia program made available by the second content source; and
   estimating the availability parameter based on the availability history.

5. The method of claim 4:
   wherein the multimedia program is an episode of a series;
   wherein determining the availability history comprises determining a delay between a start date of an availability of a previous episode of the series from the first content source and an availability of the previous episode from the second content source; and
   wherein estimating an availability start date of the multimedia program from the second content source is based on the delay and a start date of the availability of the multimedia program from the first content source.

6. The method of claim 4:
wherein the multimedia program is an episode of a series;
wherein determining the available history comprises determining an element selected from the group consisting of: an average delay between availabilities of previous episodes of the series from the first content source and corresponding availabilities of the previous episodes from the second content source and a median delay between availabilities of previous episodes of the series from the first content source and corresponding availabilities of the previous episodes from the second content source; and
wherein estimating at least an availability start date of the multimedia program from the second content source is based on the element and an availability start date of the multimedia program from the first content source.

7. The method of claim 1 further comprising:
adjusting the confidence factor responsive to subsequently verifying whether the estimated availability accurately represented the actual availability of the identified multimedia program from the second content source.

8. The method of claim 1 further comprising:
displaying, via the user equipment, a visual indicator of the multimedia program in association with the EPG; and
displaying, via the user equipment, a visual indicator of the availability parameter for the multimedia program from the second source in association with the EPG responsive to receiving the indicator of the estimated availability parameter.

9. The method of claim 8 wherein displaying a visual indicator of the availability of the multimedia program from the second content source comprises an element selected from a group consisting of: displaying an availability icon within a display field of a channel row of the EPG, the display field associated with the multimedia program and the channel row associated with the first content source, displaying the display field of the channel row of the EPG with a color that is specified to indicate the multimedia program is available from a content source other than the first content source, and displaying an availability icon with displayed information regarding a multimedia program selected from a current program listing of multimedia programs in the EPG.

10. The method of claim 1:
wherein identifying the multimedia program and estimating the availability parameter comprise identifying the multimedia program and estimating the availability parameter at a service-provider network; and
wherein providing the indicator of the estimated availability parameter for display with the EPG comprises transmitting data representative of the indicator from the service-provider network to the user equipment.

11. A service-provider network comprising:
a program datastore to store metadata representing multimedia programs available from a first content source and to store metadata representing availability metadata for the multimedia programs from a second content source;
an availability estimation agent to estimate availability parameters for at least a subset of the multimedia programs from the second content source and to update the program datastore based on the estimated availabilities;
wherein for an identified multimedia program, the availability estimate agent determines a confidence level for the estimated availability parameter based on a confidence factor associated with at least one of the second content source and the multimedia program;
an interface coupled to the program datastore and coupleable to a user equipment, the interface to provide electronic program guide ("EPG") metadata and availability metadata to the user equipment, the EPG metadata representing program metadata from the program datastore for a current program lineup for the first content source, the availability metadata representing availability parameters for at least a subset of the multimedia programs from the second content source; and
wherein the availability estimate agent further selectively updates the program metadata with the estimated availability parameter based on a comparison of the confidence level and a specified threshold.

12. The service-provider network of claim 11 wherein, for a multimedia program of the subset of multimedia programs, the availability estimation agent is to estimate an element selected from the group consisting of: an availability of a version of the multimedia program from the second content source, an availability start date for the multimedia program from the second content source, an availability end date for the multimedia program from the second content source, and a price to access the multimedia program from the second content source.

13. The service-provider network of claim 11 wherein, for a multimedia program of the subset of multimedia programs, the availability estimation agent is to estimate an availability parameter based on application of one or more availability rules representative of a contractual agreement between an entity associated with the second content source and an entity that controls multimedia content represented by the multimedia program.

14. The service-provider network of claim 11 wherein the availability estimation agent is to:
for an identified multimedia program, identify at least one related multimedia program having at least one characteristic in common with the identified multimedia program;
determine an availability history representing a history for the at least one related multimedia program made available by the second content source; and
estimate an availability parameter for the identified multimedia program based on the availability history.

15. The service-provider network of claim 14:
wherein the multimedia program is an episode of a series;
wherein the availability estimation agent is to determine the available history based on an element selected from the group consisting of: an average delay between availabilities of previous episodes of the series from the first content source and corresponding availabilities of the previous episodes from the second content source and a median delay between availabilities of previous episodes of the series from the first content source and corresponding availabilities of the previous episodes from the second content source; and
wherein the availability estimation agent is to estimate at least an availability start date of the multimedia program from the second content source based on the element and a start date of the availability of the multimedia program from the first content source.

16. The service-provider network of claim 14:
wherein the multimedia program is an episode of a series;
wherein the availability estimation agent is to determine the availability history based on a delay between a start date of an availability of a previous episode of the series from the first content source and an availability start date of the previous episode from the second content source; and
wherein the availability estimation agent is to estimate an availability start date of the multimedia program from the second content source based on the delay and a start date of the availability of the multimedia program from the first content source.

17. The service-provider network of claim 11 wherein the availability estimate agent further is to adjust the confidence factor responsive to subsequently verifying whether the estimated availability parameter accurately represented the actual availability parameter for the identified multimedia program from the second content source.

18. A device comprising:

an output coupleable to a display;

an electronic program guide ("EPG") display agent coupled to the output, the EPG display agent to provide an EPG for display, the EPG comprising a current program lineup of multimedia programs available from a first content source; and an overlay generation agent coupled to the EPG display agent, the overlay generation agent to provide a visual indicator for display in association with a multimedia program of the current program lineup, the visual indicator indicating an estimated availability parameter for the multimedia program from a second content source when a confidence level that is based on a confidence factor associated with at least one of the second content source and the multimedia program exceeds a specified threshold.

19. The device of claim 18 wherein the visual indicator comprises an element selected from a group consisting of: an availability icon displayed within a display field of a channel row of the EPG, the display field associated with the multimedia program and the channel row associated with the first content source, a coloration of the display field of the channel row of the EPG that is specified to indicate the multimedia program is available from a content source other than the first content source, and an availability icon displayed with information regarding a multimedia program selected from a current program listing of multimedia programs in the EPG.

20. The device of claim 19 further comprising:

a network interface coupleable to a service-provider network, the network interface to receive metadata representative of the EPG and availability metadata representative of availability parameters for multimedia programs from the second source;

wherein the overlay generation agent is to provide the visual indicator for display responsive to determining that the availability metadata indicate the multimedia program is estimated to be available.

* * * * *